United States Patent
Murray et al.

(10) Patent No.: US 11,473,983 B2
(45) Date of Patent: Oct. 18, 2022

(54) SUPPRESSION OF NOISE AND CROSS-TALK IN BRILLOUIN FIBER SENSORS

(71) Applicant: The Government of the United States of America, as represented by the Secretary of the Navy, Arlington, VA (US)

(72) Inventors: Joseph B. Murray, Ellicott City, MD (US); Brandon F. Redding, University Park, MD (US)

(73) Assignee: The Government of the United States of America, as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 17/383,263

(22) Filed: Jul. 22, 2021

(65) Prior Publication Data
US 2022/0026287 A1 Jan. 27, 2022

Related U.S. Application Data

(60) Provisional application No. 63/055,762, filed on Jul. 23, 2020.

(51) Int. Cl.
*G01K 11/322* (2021.01)
*G01K 3/00* (2006.01)

(52) U.S. Cl.
CPC .............. *G01K 11/322* (2021.01); *G01K 3/00* (2013.01)

(58) Field of Classification Search
CPC .. G01K 11/32; G01K 11/322; G01K 11/3206; G01K 11/324; G01K 11/00;
(Continued)

(56) References Cited

U.S. PATENT DOCUMENTS

| | | | |
|---|---|---|---|
| 2005/0213869 A1* | 9/2005 | Brown | G01D 5/35364 374/E11.015 |
| 2006/0285850 A1* | 12/2006 | Colpitts | G01D 5/35364 374/E11.015 |

(Continued)

FOREIGN PATENT DOCUMENTS

| | | | | |
|---|---|---|---|---|
| CN | 105783758 B | * | 6/2018 | ........... G01B 11/168 |
| CN | 107091698 B | * | 9/2019 | ............. G01B 11/16 |

(Continued)

OTHER PUBLICATIONS

Soto et al., "Optimization of long-range BOTDA sensors with high resolution using first-order bi-directional Raman amplification," Optics Express, vol. 19, No. 5, Feb. 2011, 14 pages.

(Continued)

*Primary Examiner* — Michael P Stafira
(74) *Attorney, Agent, or Firm* — US Naval Research Laboratory; Hong-Vinh Nguyen

(57) ABSTRACT

A dynamic Brillouin fiber sensor that is immune to fluctuations in the power, frequency, or polarizing state of the pump and probe beams is described herein. A new measurand that combines information from the complex Stokes and anti-Stokes interactions is provided to extract the absolute Brillouin frequency shift while rejecting the majority of noise sources that may limit the performance of current slope-assisted Brillouin optical time domain analysis systems.

14 Claims, 10 Drawing Sheets

(58) Field of Classification Search
CPC ........ G01K 11/12; G01K 11/30; G01K 13/00;
G01K 2213/00; G01K 1/12; G01K 13/02;
G01K 3/00
See application file for complete search history.

(56) References Cited

U.S. PATENT DOCUMENTS

| | | | |
|---|---|---|---|
| 2016/0109223 A1* | 4/2016 | Wang | G01B 11/168 356/32 |
| 2017/0248448 A1* | 8/2017 | Horiguchi | H01S 5/0071 |

FOREIGN PATENT DOCUMENTS

| | | | | |
|---|---|---|---|---|
| CN | 210981350 U | * | 7/2020 | |
| WO | WO-2019221534 A1 | * | 11/2019 | ......... G01D 5/35364 |

OTHER PUBLICATIONS

Soto et al., "Long-range simplex-coded BOTDA sensor over 120 km distance employing optical preamplification," Optics Letters, vol. 36, No. 2, Jan. 2011, pp. 232-234, 3 pages.

Song et al., "Distributed strain measurement with milimeter-order spatial resolution based on Brillouin optical correlation domain analysis," Optics Letters, vol. 31, No. 17, Sep. 2006, pp. 2526-2528, 3 pages.

Dominguez-Lopez et al., "Resolving 1 million sensing points in an optimized differential time-domain Brillouin sensor," Optics Letters, vol. 42, No. 10, May 2017, 4 pages.

Dominguez-Lopez et al., "Signal-to-Noise Ratio Improvement in BOTDA Using Balanced Detection," IEEE Photonics Technology Letters, vol. 26, No. 4, Feb. 2014, pp. 338-341, 4 pages.

Denisov et al., "Going beyond 1000000 resolved points in a Brillouin distributed fiber sensor: theoretical analysis and experimental demonstration," Light: Science & Applications, vol. 5, e16074, 2016, 8 pages.

Ferdinand, "The Evolution of Optical Fiber Sensors Technologies During the 35 Last Years and Their Applications in Structure Health Monitoring," 7th European Workshop on Structural Health Monitoring, EWSHM 2014-2nd Eur. Conf. Progn. Heal. Manag. Soc. 914-929, 2014, 16 pages.

Zhao et al., "Distributed shape sensing using Brillouin scattering in multi-core fibers," Optics Express, vol. 24, No. 22, Oct. 2016, 13 pages.

Peled et al., "Fast Brillouin optical time domain analysis for dynamic sensing," Optics Express, vol. 20, No. 8, Apr. 2012, 8 pages.

Bernini et al., "Dynamic strain measurement in optical fibers by stimulated Brillouin scattering," Optics Letters, vol. 34, No. 17, Sep. 2009, pp. 2613-2615, 3 pages.

Zhou et al., "Slope-assisted BOTDA based on vector SBS and frequency-agile technique for wide-strain-range dynamic measurements," Optics Express, vol. 25, No. 3, Feb. 2017, pp. 1889-1902, 14 pages.

Ba et al., "Distributed measurement of dynamic strain based on multi-slope assisted fast BOTDA," Optics Express, vol. 24, No. 9, May 2016, 13 pages.

Zheng et al., "Distributed vibration measurement based on a coherent multi-slope-assisted BOTDA with a large dynamic range," Optics Letters, vol. 44, No. 5, Mar. 2019, 4 pages.

Motil et al., "Pump-Power-Independent Double Slope-Assisted Distributed and Fast Brillouin Fiber-Optic Sensor," IEE Photonics Technoogy Letters, vol. 26, No. 8, Apr. 2014, pp. 797-800, 4 pages.

Peled et al., "Monitoring the propagation of mechanical waves using an optical fiber distributed and dynamic strain sensor based on BOTDA," Optics Express, vol. 21, No. 9, May 2013, 9 pages.

Peled et al., "Slope-assisted fast distributed sensing in optical fibers with arbitrary Brillouin profile," Optics Express, vol. 19, No. 21, 2011, pp. 19845-19854, 10 pages.

Minardo et al., "Heterodyne slope-assisted Brillouin optical time-domain analysis for dynamic strain measurements," Journal of Optics, vol. 18, No. 2, 2016, 7 pages.

Iribas et al., "Non-Local Effects in Brillouin Optical Time-Domain Analysis Sensors," Applied Sciences, vol. 7, 2017, 12 pages.

Murray et al., "Suppressing non-local effects due to Doppler frequency shifts in dynamic Brillouin fiber sensors," Optics Express, vol. 28, No. 8, Apr. 2020, pp. 10760-10771, 12 pages.

Murray et al., "Combining Stokes and anti-Stokes interactions to achieve ultra-low noise dynamic Brillouin strain sensing," APL Photonics 5, 116104, 2020, 10 pages.

Urricelqui et al., "BOTDA measurements tolerant to non-local effects by using a phase-modulated probe wave and RF demodulation," Optics Express, vol. 21, No. 14, Jul. 2013, pp. 17186-17194, 9 pages.

Urricelqui et al., Dynamic BOTDA measurements based on Brillouin phase-shift and RF demodulation, Optics Express, vol. 20, No. 24, 2012, pp. 26942-26949, 8 pages.

Marinelarena et al., "Gain Dependence of the Phase-Shift Spectra Measured in Coherent Brillouin Optical Time-Domain Analysis Sensors," Journal of Lightwave Technology, vol. 34, No. 17, Sep. 2016, 9 pages.

Yang et al., "Strain Dynamic Range Enlargement of Slope-Assisted BOTDA by Using Brillouin Phase-Gain Ratio," Journal of Lightwave Technology, vol. 35, No. 20, Oct. 2017, p. 4451-4458, 8 pages.

Yang et al., "Brillouin Distributed Optical Fiber Sensor Based on a Closed-Loop Configuration," Journal of Lightwave Technology, vol. 36, No. 5, Mar. 2018, 10 pages.

Urricequi et al., "Polarization Diversity Scheme for BOTDA Sensors Based on a Double Orthogonal Pump Interaction," Journal of Lightwave Technology, vol. 33, No. 12, Jun. 2015, 6 pages.

Kadum et al., "Characterization of the Noise Induced by Stimulated Brillouin Scattering in Distributed Sensing," Sensors (Switzerland), vol. 20, 2020, 15 pages.

Thevenaz et al., "Impact of pump depletion on the determination of the Brillouin gain frequency in distributed fiber sensors," International Conference on Optical Fibre Sensors, 2011, 4 pages.

Shlomovits et al., "The Effect of Source Phase Noise on Stimulated Brillouin Amplification," Journal of Lightwave Technology, vol. 33, No. 12, Jun. 2015, pp. 2639-2645, 7 pages.

Minardo et al., "Analysis of SNR penalty in Brillouin optical time-domain analysis sensors induced by laser source phase noise," Journal of Optics (United Kingdom), vol. 18, No. 2, 2016, 10 pages.

Bernini et al., "Long-range distributed Brillouin fiber sensors by use of an unbalanced double sideband probe," Optics Express, vol. 19, No. 24, Nov. 2011, 12 pages.

Minardo et al., "A Simple Technique for Reducing Pump Depletion in Long-Range Distributed Brillouin Fiber Sensors," IEEE Sensors Journal, vol. 9, No. 6, Jun. 2009, 2 pages.

Lopez-Gil et al., "Simple Baseband Method for the Distributed Analysis of Brillouin Phase-Shift Spectra," IEEE Photonics Technology Letters, vol. 28, No. 13, Jul. 2016, 4 pages.

Zhang et al., "Ultra-long dual-sideband BOTDA with balanced detection," Optics & Laser Technology, vol. 68, May 2015, pp. 206-210, 5 pages.

Dominguez-Lopez et al., "Ultra-long dual-sideband BOTDA with balanced detection," IEEE Photonics Technology Letters, vol. 26, No. 18, Sep. 2014, 4 pages.

Lopez-Gil et al., "Simple Method for the Elimination of Polarization Noise in BOTDA Using Balanced Detection and Orthogonal Probe Sidebands," Journal of Lightwave Technology, vol. 33, Issue 12, 2016, pp. 2605-2610, 6 pages.

Yang et al., "Stokes and anti-Stokes differential pulse pair based distributed Brillouin fiber sensor with double-sideband probe wave," Optics Express, vol. 22, Issue 3, 2014, pp. 2881-2888, 8 pages.

Hotate et al., "Suppression of Signal Fluctuation in Brillouin Optical Correlation Domain Analysis System Using Polarization Diversity Scheme," IEEE Photonics Technology Letters, vol. 18, Issue 24, 2006, 3 pages.

Shmilovitch et al., "Dual-pump push-pull polarization control using stimulated Brillouin scattering," Optics Express, vol. 19, Issue 27, 2011, pp. 25873-25880, 8 pages.

(56) References Cited

OTHER PUBLICATIONS

Xu et al., "Simultaneous temperature sensing using distributed cascading fiber Bragg grating-based single-ended Brillouin optical time-domain analyzer," Laser Physics, vol. 28, No. 12, Oct. 2018, 5 pages.

Chen et al., "Distributed Fiber-Optic Acoustic Sensor With Enhanced Response Bandwidth and High Signal-to-Noise Ratio," Journal of Ligthwave Technology, vol. 35, Issue 10, May 2017, 7 pages.

Preussler et al., "Brillouin scattering gain bandwidth reduction down to 3.4MHz," Optics Express, vol. 19, Issue 9, 2011, pp. 8565-8570.

Yang et al., "Enhancing strain dynamic range of slope-assisted BOTDA by manipulating Brillouin gain spectrum shape," Optics Express, vol. 26, Issue 25, 2018, pp. 32599-32607, 9 pages.

Zornoza et al., "Brillouin distributed sensor using RF shaping of pump pulses," Measurement Science and Technology, vol. 21, No. 9, Jul. 2010, 9 pages.

\* cited by examiner

SUPPRESSION OF NOISE AND CROSS-TALK IN BRILLOUIN FIBER SENSORS

This application claims the benefit of U.S. provisional application No. 63/055,762 filed on Jul. 23, 2020, the entirety of which is incorporated herein by reference.

FEDERALLY-SPONSORED RESEARCH AND DEVELOPMENT

The United States Government has ownership rights in this invention. Licensing inquiries may be directed to Office of Technology Transfer, US Naval Research Laboratory, Code 1004, Washington, D.C. 20375, USA; +1.202.767.7230; techtran@nrl.navy.mil, referencing 113423-US2.

BACKGROUND

Brillouin based fiber optic sensors are attractive due to their ability to provide absolute strain measurements using standard optical fibers, typically used in fiber communications systems. In addition, these sensors are able to perform fully distributed measurements over ranges in excess of 100 kilometers or with spatial resolution down to a few millimeters. This combination has enabled massively parallel sensing systems capable of probing the strain or temperature at more than $10^6$ discrete locations. As a result, Brillouin based sensors have been used in a range of applications from structural health monitoring to distributed shape sensing. However, the vast majority of Brillouin based sensors are restricted to static or quasi-static measurements and cannot provide the same level of sensitivity as other fiber optic sensing modalities.

Much of the recent work in Brillouin based fiber sensors has sought to address these limitations by introducing higher speed and lower noise sensing architectures, one of which is the slope-assisted Brillouin optical time domain analysis (SA-BOTDA) systems. These systems enable single-shot measurements by fixing the frequency offset between the pump and probe beams and inferring shifts in the Brillouin frequency from changes in the measured Brillouin gain and/or phase. However, SA-BOTDA systems are susceptible to a number of environmental and technical noise sources and often require extensive averaging to achieve acceptable sensitivity. For example, these systems are extremely sensitive to fluctuations in the laser frequency or intensity, both of which can introduce modulations in the Brillouin interaction that are indistinguishable from changes in the Brillouin frequency due to strain or temperature. Cross-talk is also a major challenge in SA-BOTDA sensors. A common source of cross-talk is pump depletion, which occurs when a change in the Brillouin frequency at one position in the fiber influences the transmitted pump power and thereby alters the gain measured at other positions in the fiber. Dynamic strain in the fiber itself can also introduce cross-talk by shifting the frequency of the transmitted pump or probe light, which affects the Brillouin interaction in other parts of the fiber.

In recent years, a number of modifications to the original gain measuring SA-BOTDA architecture have been proposed to address these challenges. For example, systems designed to measure the Brillouin phase shift have been introduced to reduce the pump power dependence of gain based systems. It has also been shown that measuring the ratio of the phase to gain provided even better immunity to pump power fluctuations while also increasing the dynamic range of the sensor. A variety of multiplexing techniques have been proposed to further increase the dynamic range of SA-BOTDA systems. While these efforts showed that may of the challenges associated with the SA-BOTDA systems are tractable, a single system capable of mitigating each of these sources of noise and cross-talk remains to be demonstrated.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A method for suppressing noise and cross-talk in a Brillouin fiber sensor is provided. The method includes injecting a pulsed pump into a first end of the fiber sensor and transmitting a plurality of co-propagating probe beams into a second end of the fiber sensor. The method further includes measuring photocurrent produced by interactions of the transmitted probe beams. A measurand based on the measured photocurrent is determined. The measurand is configured to extract a Brillouin frequency shift while suppressing noise and cross-talk originating from fluctuations in power, frequency or polarization state of the pulsed pump or the probe beams. The method further includes detecting a change in a parameter of interest along a length of the fiber sensor based on the measurand.

A fiber optic sensor system is also provided. The system includes an optical source configured to output a first optical signal into a first end of an optical fiber and a second optical signal into a second end of the optical fiber. The second optical signal is modulated into a plurality of co-propagating probe beams prior to being transmitted into the optical fiber. The system further includes a pair of photodetectors configured to measure photocurrent produced by interactions of the transmitted probe beams. A processing unit is also included in the system. The processing unit is configured to determine a measurand based on the measured photocurrent and detect a change in a parameter of interest along a length of the optical fiber based on the measurand. The measurand is configured to extract a Brillouin frequency shift while suppressing noise and cross-talk originating from the fluctuations in power, frequency or polarization state of the pulsed pump or the probe beams.

Figure 1:
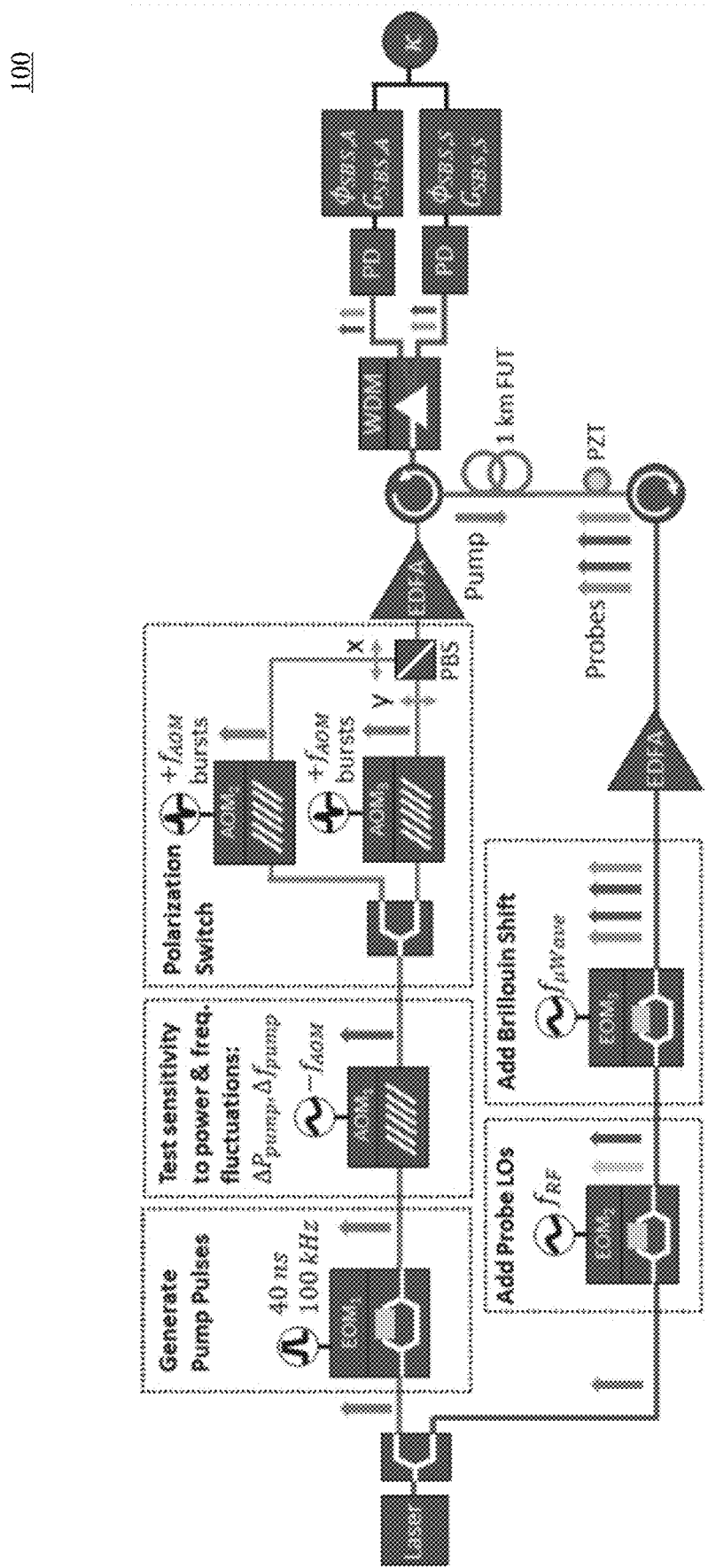
FIG. 1 is a block diagram of a fiber optic sensor system, according to an example embodiment.

The features and advantages of embodiments will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

Introduction

References in the specification to "one embodiment," an embodiment, "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, it is submitted that it is within the knowledge of one skilled in the art to effect such feature, structure, or characteristic in connection with other embodiments whether or not explicitly described.

It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

Terminology

The terminology used in the specification is for the purpose of describing particular embodiments, and is not intended to be limiting. In the description of the embodiments and the claims, the following terminology will be used in accordance with the definition set out below.

As used herein, the singular forms "a," "an," and "the" do not preclude plural referents, unless the content clearly dictates otherwise.

As used herein, the term "and/or" includes any and all combinations of one or more of the associated listed items.

As used herein, the term "about" when used in conjunction with a stated numerical value or range denotes somewhat more or somewhat less than the stated value or range, to within a range of ±10% of that stated.

Terminology used herein should not be construed as being "means-plus-function" language unless the term "means" is expressly used in association therewith.

Overview

Embodiments for suppressing noise and cross-talk in Brillouin fiber sensor are described herein. In particular, a dynamic Brillouin sensor that is largely immune to fluctuations in the power, frequency, and polarizing state of the pump and probe beams is described herein. A new measurand that combines information from the complex Stokes and anti-Stokes interactions is provided to extract the absolute Brillouin frequency shift while rejecting the majority of noise sources that may limit the performance of current BOTDA type systems. The sensor system also greatly reduces experimental technical noise due to the finite signal to noise ratio (SNR) of the electrical radio frequency (RF) modulator. For example, an embodiment of the sensor achieves a minimum detectable strain below 20 $n\varepsilon/Hz^{1/2}$ in approximately 1 kilometer of fiber with 4 meter spatial resolution and 25 kHz bandwidth.

Brillouin based fiber sensors leverage a non-linear interaction between an incident beam travelling in an optical fiber and acoustic photons in the fiber glass. An optical beam with sufficient intensity exchanges energy with the optical medium and provokes light to be scattered in the reverse direction in a spontaneous Brillouin scattering process. This scattering process may become stimulated Brillouin scattering (SBS) when the intensity of the input light is higher than a Brillouin threshold. A pump-probe technique may also be used to achieve SBS using two optical light waves, one is the optical pulse or pump and the other, a continuous wave (CW), the probe. With two light waves, SBS may be achieved below the threshold required to initiate the SBS process with just a single optical light wave. When the frequency difference between the pump and probe is comparable to the Brillouin frequency shift, the probe induces spontaneous Brillouin scattering and experiences gain or amplification. By measuring the relative frequency between the pump and probe and the change in intensity of the probe, the Brillouin spectrum may be determined. Changes in certain parameters (e.g., strain, temperature, pressure, etc.) in the fiber will cause shifts in the peak of the Brillouin gain spectrum. Thus, because the Brillouin frequency ($f_{SBS}$) is proportional to these parameters in the fiber, changes in the fiber with respect to these parameters may be detected based on the Brillouin frequency shift.

EXAMPLE EMBODIMENTS

FIG. 1 is a block diagram of a fiber optic sensor system 100, according to an example embodiment. System 100 may have many different applications, from shape sensing for hydrophone arrays to structural health, fatigue or environmental monitoring. Example systems or environments that may require such monitoring include ship hull, drive trains, catapults, directed energy weapons, nuclear environments, airframe strain, pipeline, or cable.

System 100 may include an optical source, an optical fiber, multiple modulators and photodetectors, and a processing unit, among other components. In embodiments, system 100 may include more or fewer components than shown in FIG. 1. The optical source is configured to output a first optical signal into a first end of an optical fiber and a second optical signal into a second of the optical fiber. The first optical signal may be modulated, by one or more modulators, into a pulsed beam prior to being injected into the first end of the optical fiber. The second optical signal may be modulated, also by one or more modulators, into a plurality of co-propagating probe beams prior to being transmitted into the optical fiber. Thus, all the probe beams are transmitted along the same path from the generation point until the end point of detection. The probe beams may include a Stokes probe and an anti-Stokes probe and their corresponding local oscillator sidebands. The photodetectors are configured to measure photocurrent produced by interactions of the transmitted probe beams. The photodetectors may be implemented by any photo sensing device, for example, photodiodes and phototransistors.

System 100 may further include a processing unit configured to determine a measurand based on the measured photocurrent. The measurand is designed to extract the Brillouin frequency shift while suppressing noise and cross-talk to do fluctuations in the power, frequency, or polarization state of the pump and probe beams. In other words, the measurand provides a linear response to changes in the Brillouin frequency while removing any dependence on fluctuations in pump power or in frequency of the pulsed pump or probe beams. System 100 may be implemented in many ways, and such implementation detail will be described below.

Brillouin based fiber optic sensors are designed to estimate the Brillouin frequency, $f_{SBS}$, which has a well-known relationship to the strain and temperature in a fiber. In slop-assisted Brillouin sensors, the Brillouin frequency may be inferred from a single measurement of the stimulated Brillouin scattering (SBS) interaction which may be described in terms of the complex gain, $\tilde{G}_{SBS}$, as $$\tilde{G}_{SBS} = G_{SBS} + i\phi_{SBS} = \eta_{pol} \frac{g_B P_{pump} L \Gamma_B^2}{4\Delta f^2 + \Gamma_B^2}(1 + i2\Delta f/\Gamma_B). \quad (1)$$

In this expression, $G_{SBS}$, and $\phi_{SBS}$ are the real and imaginary parts of the complex gain, $\eta_{pol}$ describes the mixing efficiency due to overlap between the polarization states of the pump and probe, $g_B$ is the SBS gain coefficient, $P_{pump}$ is the pump power, L is the interaction length between the pump and probe, and $\Gamma_B$ is the full width at half maximum of the SBS gain spectrum. $\Delta f = f_{probe} - f_{pump} - f_{SBS}$ is the frequency offset of the probe from the center of the SBS gain spectrum (assuming a Stokes shifted probe) where $f_{probe}$ and $f_{pump}$ are the optical frequencies of the probe and pump, respectively.

A challenge in designing a dynamic Brillouin sensor is finding an efficient method to extract $f_{SBS}$ from $\tilde{G}_{SBS}$ while minimizing the dependence on fluctuations in the frequency, power, or polarization state of the pump and probe beams. For example, if the inferred measurement of $f_{SBS}$ is sensitive to changes in the pump power, the sensor will be exposed to laser intensity noise and cross-talk due to pump depletion. Similarly, if the measurement is sensitive to changes in the pump or probe frequency, the measurement will be exposed to laser frequency noise and cross-talk due to dynamic strain induced Doppler shifts. The sensor also needs to compensate for polarization fading, since the strength of the SBS interaction depends on the overlap between the polarization states of the pump and probe. Finally, a slope-assisted Brillouin sensor should provide an accurate measurement of $f_{SBS}$ over as large a range of $\Delta f$ as possible to maximize the dynamic range.

Figures 2, 3:
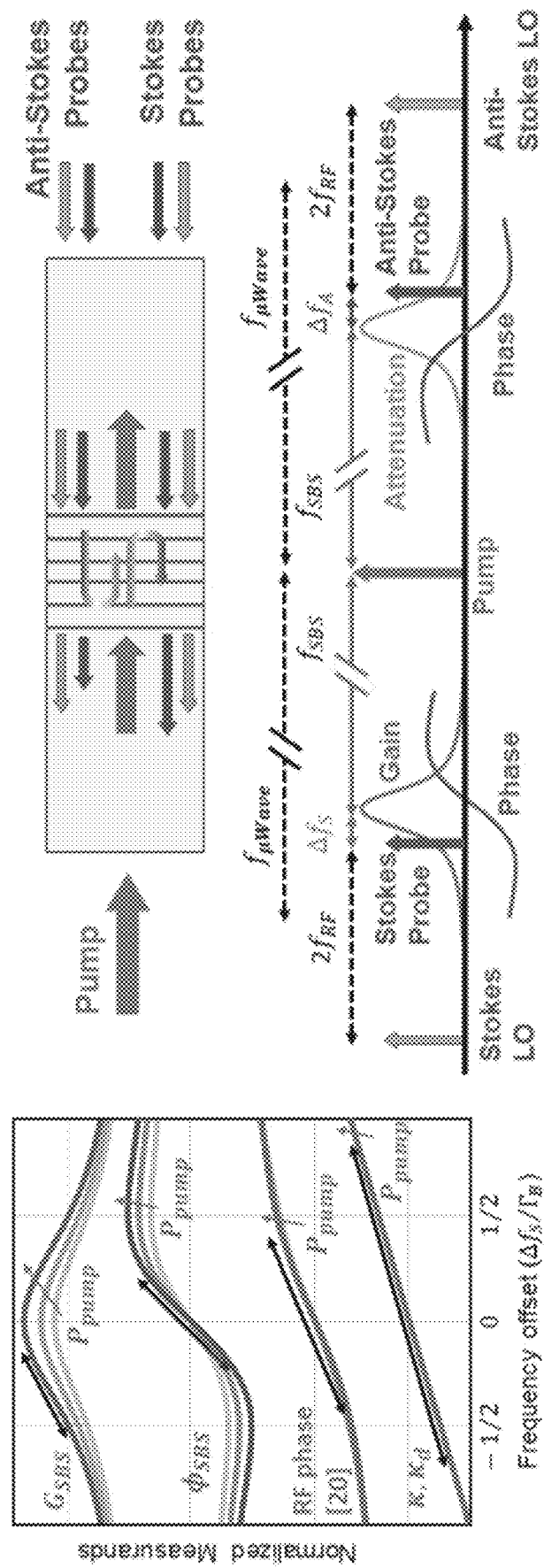
FIG. 2 is a plot of normalized response of different measurands commonly used in SA-BOTDA systems.
FIG. 3 is schematic illustrating a frequency scheme used to measure the gain, loss, and phase associated with Stokes and anti-Stokes interactions, according to an embodiment.

FIG. 2 is a plot of normalized response of different measurands commonly used in SA-BOTDA systems. The measurands include the Brillouin gain ($G_{SBS}$), phase ($\phi_{SBS}$), "RF phase", and the phase to gain ratio κ, or $\kappa_d$.

The first generation of SA-BOTDA systems operates by measuring changes in the intensity of the SBS signal gain, $e^{2G_{SBS}}$ (note that this may be approximated as $1+2G_{SBS}$ in the case of small gain), while positioning the probe near the linear region of the Brillouin gain spectrum (i.e., $\Delta f \approx \Gamma_B/2$). In this regime, changes in the Brillouin frequency have a roughly linear dependence on the Brillouin frequency shift, as shown in FIG. 2. However, the Brillouin gain also depends on the pump power, exposing these measurements to noise due to laser intensity fluctuations and cross-talk due to pump depletion. This approach also limited the dynamic range to $\Gamma_B/2$.

As an alternative, the SBS phase, $\phi_{SBS}$, may be measured to infer changes in the Brillouin frequency while positioning the probe near the center of Brillouin spectrum (i.e., $\Delta f \approx 0$). However, this has the same drawbacks as the gain measuring systems. Instead, a phase measuring system using a phase modulated probe in which the measured "RF phase" is largely immune to pump power fluctuations may be used. This measurand also provides a larger dynamic range, but the response is still slightly non-linear, as shown in FIG. 2.

As a further improvement, the ratio of phase to gain is used, providing a nearly ideal cancellation of the pump power dependence.

$$\kappa \equiv \frac{\phi_{SBS}}{G_{SBS}} = \frac{2\Delta f}{\Gamma_B} \quad (2)$$

This approach also provides a linear response over an even larger dynamic range.

While using the phase to gain ratio addressed the pump power dependence of SA-BOTDA systems, they remained susceptible to noise and cross-talk due to fluctuations in the frequency of the pump or probe. Since the phase to gain ratio is proportional to $\Delta f$, a change in $f_{probe}$ or $f_{pump}$ is indistinguishable from a change in $f_{SBS}$. The same limitation applied to gain measuring or phase measuring SA-BOTDA systems. This may be particularly problematic in long-range systems where the optical path mismatch between the pump and probe can reach tens of kilometers, imposing strict constraints on the laser frequency stability. In addition, it has been shown that Doppler frequency shifts introduced by dynamic strain in the fiber itself may result in significant levels of cross-talk if this dependence is not addressed.

While SA-BOTDA systems that only probe the Stokes interaction cannot differentiate between a change in the Brillouin frequency and a change in the laser frequency, the sensor system described herein can disambiguate these two effects with additional information with an addition of an anti-Stokes probe. This is possible because the Stokes and anti-Stokes probes exhibit a correlated response to a change in the Brillouin frequency while the response to a change in the pump or probe frequencies is anti-correlated. This distinction is evident considering the frequency offset between the Stokes and anti-Stokes probes and the respective Brillouin gain and attenuation spectra:

$$\Delta f_S = f_{pump} - f_{probe,S} - f_{SBS} \quad (3a)$$

$$\Delta f_A = f_{probe,A} - f_{pump} - f_{SBS} \quad (3b)$$

The subscripts S and A are used to indicate the Stokes and anti-Stokes interactions, respectively.

FIG. 3 is a schematic illustrating a frequency scheme used to measure the gain, loss, and phase associated with Stokes and anti-Stokes interactions, according to an example embodiment. It is possible to implement the sensor system described herein with combined Stokes and anti-Stokes probes on a single photodetector to suppress the sensitivity to fluctuations in the pump or probe frequency by a factor proportional to the gain. However, this implementation may be limited to operation at relatively low gain, thereby limiting the noise performance of the sensor. In addition, the resulting measurand may remain somewhat sensitive to pump power fluctuations and does not provide a linear response over as large a dynamic range as the phase to gain ratio.

The sensor system (e.g., system 100 shown in FIG. 1) described herein is a modified SA-BOTDA architecture capable of separately measuring the complex gain of the Stokes and anti-Stokes SBS interactions in a single shot. That is, the sensor is configured to measure both $G_{SBS,S}$ and $\phi_{SBS,S}$ resulting from the Stokes interactions as well as $G_{SBS,A}$ and $\phi_{SBS,A}$ resulting from the anti-Stokes interactions. Using these four measurements, a new measurand, $\kappa_d$ may be defined as:

$$\kappa_d \equiv -\frac{\phi_{SBS,S} + \phi_{SBS,A}}{G_{SBS,S} + G_{SBS,A}} \quad (4)$$

where the subscript, "d", denotes the use of dual probes and differentiates it from $\kappa$, in equation 2, which only uses information from the Stokes or anti-Stokes interaction but not both. This measurand is similar to the gain to phase ratio and retains the same immunity to pump power dependence and large dynamic range, as shown in FIG. 2. In addition, this dual probe based approach also provides immunity to frequency fluctuations in the pump or probe frequency. The phase of the Stokes and anti-Stokes interactions may be considered:

$$\phi_{SBS,S} = G_{SBS,S} \cdot \frac{2\Delta f_S}{\Gamma_B} = G_{SBS,S} \cdot \frac{2(f_{pump} - f_{probe,S} - f_{SBS})}{\Gamma_B} \quad (5a)$$

$$\phi_{SBS,A} = G_{SBS,A} \cdot \frac{2\Delta f_A}{\Gamma_B} = G_{SBS,A} \cdot \frac{2(f_{probe,A} - f_{pump} - f_{SBS})}{\Gamma_B} \quad (5b)$$

Using these expressions, $\kappa_d$ may be rewritten as:

$$\kappa_d = -\frac{\frac{2}{\Gamma_B}\left[\begin{array}{c} G_{SBS,S}(f_{pump} - f_{probe,S} - f_{SBS}) + \\ G_{SBS,A}(f_{probe,A} - f_{pump} - f_{SBS}) \end{array}\right]}{G_{SBS,S} + G_{SBS,A}} \cong \frac{2\Delta f_{SBS}}{\Gamma_B} \quad (6)$$

where $f_{SBS}$ is a change in the Brillouin frequency, and the approximation assumes that $G_{SBS,S} \cong G_{SBS,A}$, which is valid as long as the Brillouin frequency shift (~10 Ghz) is small with respect to the optical pump and probe frequencies (~193 Thz). This expression also assumes that any change in the frequency of the Stokes probe is also experienced by the anti-Stokes probes (i.e., $f_{probe,S} = f_{probe,A}$). To satisfy this assumption, the system described herein is configured such that the Stokes and anti-Stokes probes co-propagate from the laser through the fiber under test so that any laser frequency noise or dynamic strain induced by the frequency shifts are common to both probes. Under these assumptions, this measurand provides a linear response to changes in the Brillouin frequency while removing any dependence on fluctuations in the pump power or in the frequency of the pump and probe beams.

The efficiency of the Brillouin interaction depends on the overlap between the polarization of the pump and probe beam, described by the polarizing mixing coefficient, $\eta_{pol}$. In traditional Brillouin sensors designed for static or quasi-static operation, polarization fading is often suppressed by scrambling the polarization state of the pump or probe and averaging over many measurements. However, this approach requires extensive averaging, which degrades the sensor bandwidth. As an alternative, the fiber may be probed with orthogonal pump (or probe) polarization in sequential measurements. While this reduces the sensor bandwidth by a factor of two, it efficiently eliminates fading since the polarization states of the pump and probe will at least partially overlap at every position in the fiber for one of the two launch polarization states. This approach is also compatible with the combined Stokes and anti-Stokes measurand described herein. Specifically, if the fiber is probed with alternating "x" and "y" polarized pumps, the sequential measurements may be combined to obtain the Brillouin gain and phase used above.

$$\phi_{SBS,S(A)} = \phi_{SBS,S(A)-x} + \phi_{SBS,S(A)-y} \quad (7a)$$

$$e^{G_{SBS,S(A)}} = e^{G_{SBS,S(A)-x}} e^{G_{SBS,S(A)-y}} \quad (7b)$$

where the subscripts S(A) refer to the Stokes (anti-Stokes) interactions and the −x and −y subscripts indicate sequential measurements with orthogonally polarized pump pulses. Note that using both Stokes and anti-Stokes probes compensates for polarization pulling of the pump, which is an additional source of cross-talk in many SA-BOTDA systems.

The fiber sensor system described herein may be implemented in various way. In an embodiment, a modified SA-BOTDA system, as shown in FIG. 1, is configured to extract the $\kappa_d$ measurand. The various components of system 100 of FIG. 1 may be implemented with commercial-off-the-shelf components and/or custom hardware and/or software. This embodiment is described with specific configurations, values and components for illustrative purposes only and is not intended to be limiting.

In operation, the system injects a pulsed pump at one end of the fiber and counter-propagating CW Stokes and anti-Stokes probes from the distal end of the fiber. In order to measure the complex Brillouin interaction (including the gain or attenuation and phase), a pair of CW local oscillators (LOs) that co-propagate with the Stokes and anti-Stokes probes is introduced. The relative frequencies of the pump, probes, and LOs are shown in FIG. 3.

A narrow-linewidth laser may be divided into a pump path and probe path. Along the pump path, light may be directed to an electro-optic intensity modulator (EOM₁), which may be used to carve 40 ns pulses at a repetition rate of 100 kHz. The pulses may then be coupled through an acoustic-optic modulator (AOM₁) that may be used to test the system by modulating the power or frequency of the pump pulse. This may be used to measure the ability of the sensor to suppress noise due to fluctuations in the laser power or frequency. The pump pulses may then be directed into a polarization switch that provides two paths with matched AOMs that may be recombined on a fiber optic polarizing beam splitter. These AOMs may be driven with alternating 100 ns bursts such that sequential pump pulses passed through the upper path or lower path in order to probe the fiber with orthogonal polarizations. Note that $AOM_1$ introduces a nominal frequency shift of −55 MHz ($-f_{AOM}$) while $AOM_2$ and $AOM_3$ are configured to introduce a compensating frequency shift of +55 MHz ($+f_{AOM}$), returning the pump pulses to the original laser frequency. Finally, the pump pulses may be amplified by an Erbium doped fiber amplifier (EDFA) to a peak power of ~100 mW before entering the fiber under test (FUT).

In the probe path, light may be directed through a pair of EOMs, DC biased for carrier suppression, to create four probe frequencies. $EOM_2$ may be driven with an electrical sinewave (e.g., from an RF signal generator) with frequency $f_{RF}$ (60 MHz) in order to generate a pair of optical sidebands shifted by $f_{RF}$ relative to the original laser frequency, $f_0$. $EOM_3$ may create two probe and LO pairs at the Stokes and anti-Stokes frequencies. The drive frequency applied to $EOM_3$ may be set to $f_{\mu Wave} \cong f_{SBS} - f_{RF}$ where $f_{SBS}$ is the nominal Brillouin frequency in the fiber. Together, these EOMs generated four probe lines at frequencies $f_0 \pm f_{RF} \pm f_{\mu Wave}$, where $f_0$ is the initial laser frequency and is also equal to $f_{pump}$. The probe lines may then be amplified by a second EDFA and coupled into the FUT. The transmitted Stokes and anti-Stokes probes along with their respective LOs may be separated using a wavelength division multiplexer and measured on a pair of amplified photodetectors (e.g., Ultrafast Sensors IAR852) and digitized at 1 GS/s.

The measured photocurrent produced by the Stokes and anti-Stokes probes interfering with their respective LOs at a frequency of $2f_{RF}$ may be expressed as:

$$i_S = RA_S^2 e^{G_{SBS,S}} \cos(4\pi f_{RF} t + [\phi_{env} + \phi_{RF} - \phi_\mu W + \phi_{SBS,S}] - [\phi_{env} - \phi_{RF} - \phi_\mu W] + \Delta\phi_{0,S}) \quad (8a)$$

$$i_A = RA_A^2 e^{-G_{SBS,A}} \cos(4\pi f_{RF} t + [\phi_{env} + \phi_{RF} + \phi_\mu W] - [\phi_{env} - \phi_{RF} + \phi_\mu W + \phi_{SBS,A}] + \Delta\phi_{0,A}) \quad (8b)$$

where R is the responsivity of the photodetector and $A_{S(A)}$ is the magnitude of the Stokes (anti-Stokes) probe and LO beat signal on the detector in the absence of a Brillouin interaction. The phase terms in the first bracket represent changes in the phase of the upper RF sideband (at $f_0 - f_{RF} \pm f_{\mu Wave}$). The first term, $\phi_{env}$, describes changes in the optical pathlength due to environmental effects such as fluctuations in temperature. Since the probes and LOs follow the same path from the modulator to the detectors, this term is common to each RF sideband. As a result, the sensor is effectively immune to environmental noise, highlighting the advantage of using co-propagating LOs. In contrast, many traditional interferometer designs include spatially separated LOs and probes that are later recombined, and thus the LOs are not co-propagated. The second term, $\phi_{RF}$, describes phase noise introduced by the electrical signal generator used to drive $EOM_2$. This phase has a differential effect on the upper and lower RF sidebands and will be retained when the relative phase between the RF sidebands is extracted via IQ demodulation of $i_{S(A)}$. Similarly, $\phi_{\mu W}$, describes phase noise introduced by the microwave signal applied to $EOM_3$. However, since $EOM_3$ is common to both the upper and lower RF sidebands the sensor is immune to this potential noise source. The $\phi_{SBS}$ terms describe the phase introduced by the Brillouin interaction that acts on the upper RF sideband of the Stokes probe and the lower RF sideband of the anti-Stokes probes, as shown in FIG. 3. Lastly, $\Delta\phi_{0,S(A)}$ describes the initial phase difference between the upper and lower RF sidebands (e.g., due to dispersion).

After digitizing these interference signals, the amplitude and phase of the Stokes and anti-Stokes interactions may be extracted via in-phase and quadrature (IQ) demodulation.

Note that the initial phase difference between the RF sidebands, $\Delta\phi_{0,S(A)}$, and the amplitude of the probes without Brillouin interactions, $A_{S(A)}$, may be calibrated in a measurement without the pump pulse and removed (in practice, this may be achieved by using a slightly lower pump pulse repetition rate than the length of the FUT would allow so that some of the probe light passes through the FUT without interacting with a pump). This provides a demodulated phase that retains the desired dependence on the phase of the Brillouin interaction, but also depends on the phase noise introduced by the RF drive applied to $EOM_2$.

$$\theta_{meas,S} = 2\phi_{RF} + \phi_{SBS,S} \quad (9a)$$

$$\theta_{meas,A} = 2\phi_{RF} - \phi_{SBS,A} \quad (9b)$$

Fortunately, the RF modulator phase dependence is removed when we use these terms to recover $\kappa_d$:

$$\kappa_{d,meas} = -\frac{\theta_{meas,S} - \theta_{meas,A}}{G_{meas,S} + G_{meas,A}} \quad (10)$$

This highlights an additional advantage of the scheme described herein, since a phase measuring SA-BOTDA system that only recorded the Stokes interaction would be exposed to noise due to the RF modulator. As will be described below, this noise source may be quite significant.

Finally, $\kappa_{d,meas}$ may be converted to strain via equation 6 using a measured Brillouin linewidth of $\Gamma_B = 48$ MHz and a measured conversion factor of 47.8 kHz/με.

Figures 4, 5:
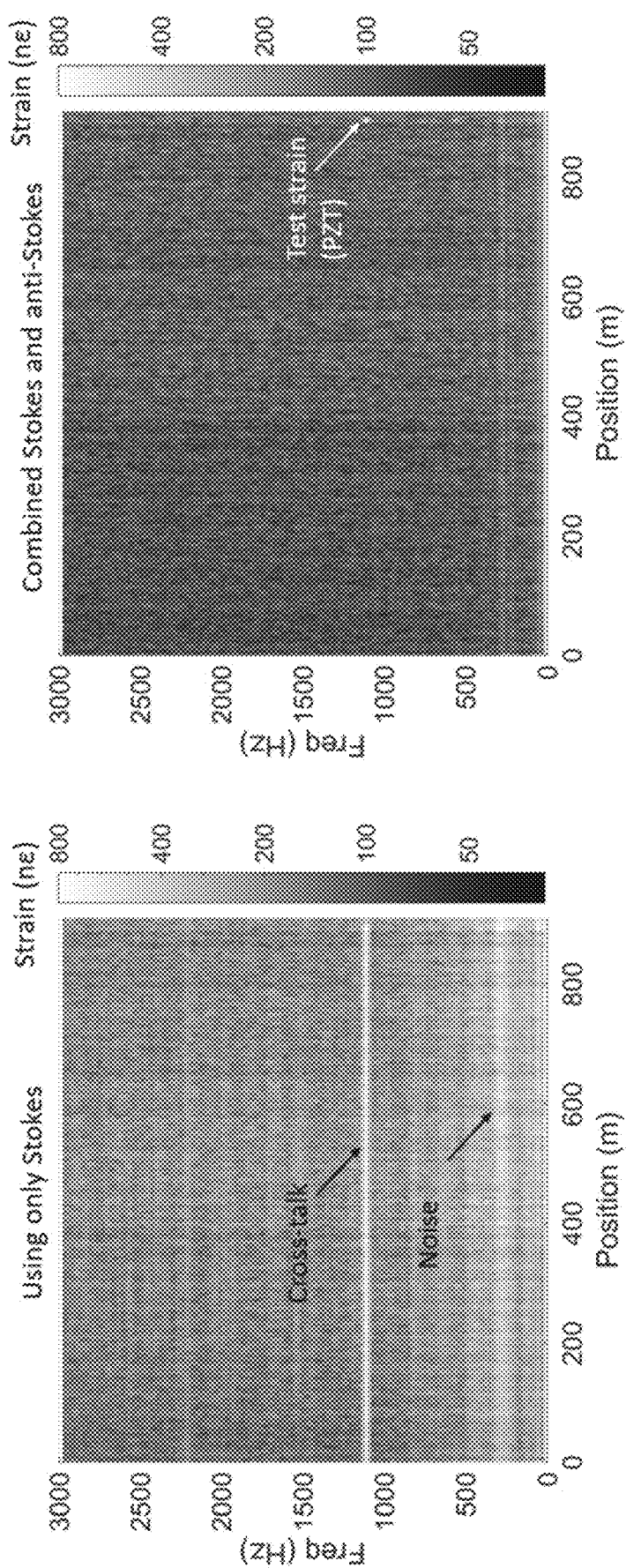
FIG. 4 depicts a spectrogram of strain amplitude spectral density plotted against position and frequency.
FIG. 5 depicts another spectrogram of strain amplitude spectral density plotted against position, according to an example embodiment.

FIG. 4 depicts a spectrogram of strain amplitude spectral density plotted against position and frequency. This plot is for a system that uses only the Stokes interaction rather than combining the Stokes and anti-Stokes interactions. In this case, the system was used to probe nearly 1 km of fiber with a piezo electric transducer (PZT) stage located near the end of the fiber driven at 1.1 kHz with a root mean squared (RMS) amplitude of ~700 nε. The system provided a spatial resolution of 4 m and a sensor bandwidth of 25 kHz. This measurement is susceptible to modulator phase noise and frequency noise/cross-talk. The cross-talk indicated in FIG. 4 is due to the Doppler frequency shift introduced by the PZT stage.

In contrast, FIG. 5 depicts another spectrogram of strain amplitude spectral density plotted against position, for the system described herein that uses both Stokes and anti-Stokes interactions. The PZT modulation at ~900 m is clearly visible in FIG. 5 without signs of cross-talk.

Figure 6:
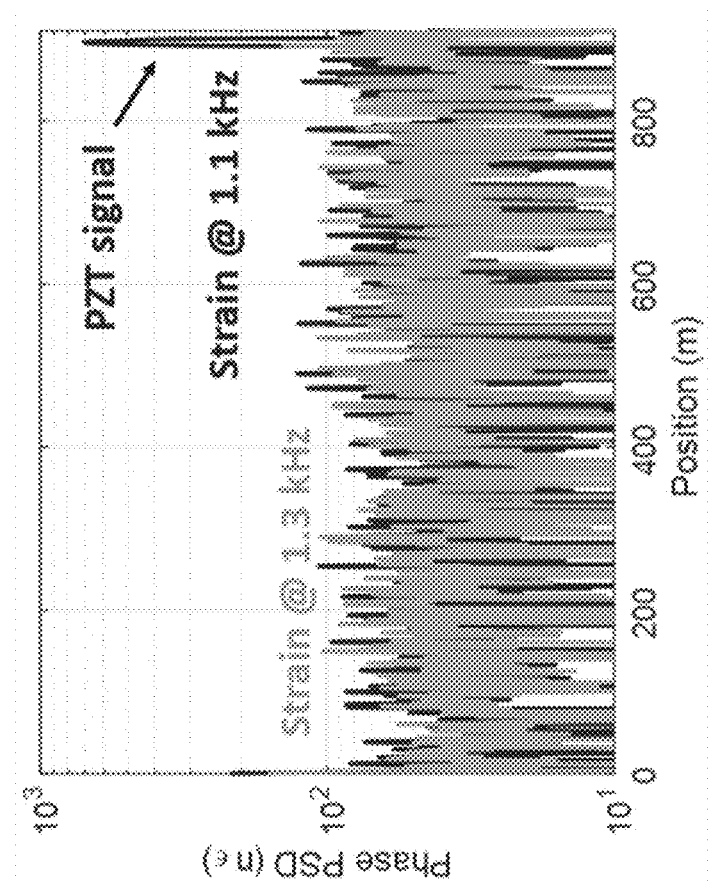
FIG. 6 depicts a horizontal slice of the spectrogram in FIG. 5, according to an example embodiment.

FIG. 6 depicts a horizontal slice of the spectrogram shown in FIG. 5. In FIG. 6, a cross-sectional plot showing the strain at the PZT drive frequency of 1.1 kHz as a function of position is presented. This measurement shows clear localization of the dynamic strain signal while any residual cross-talk (e.g., due to pump depletion or strain-induced Doppler shifts) is suppressed below the noise floor of the measurement.

Figure 7:
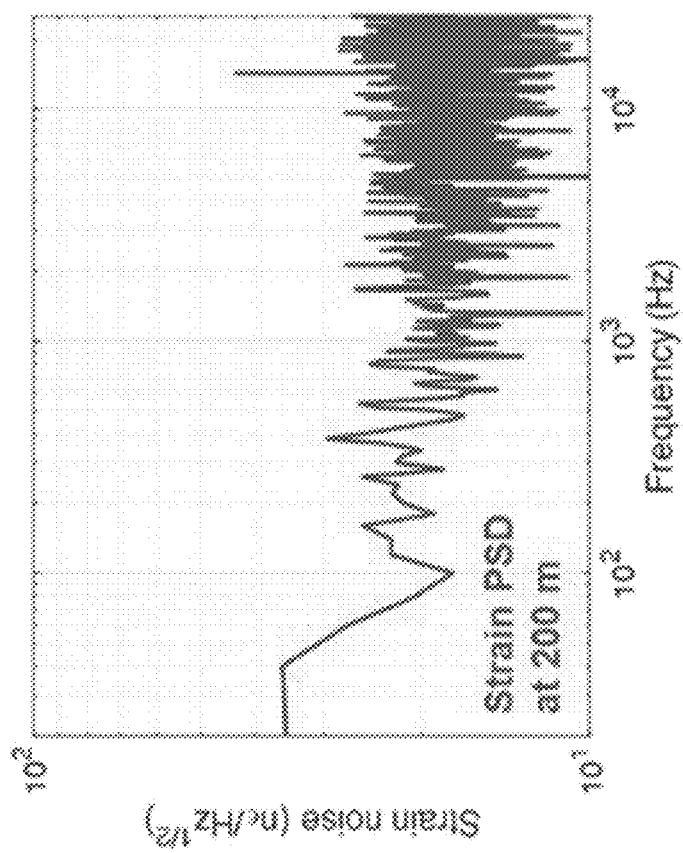
FIG. 7 is a plot of measured strain noise versus frequency, according to an embodiment.

FIG. 7 is a plot of measured strain noise versus frequency. FIG. 7 shows the minimum detectable strain, indicating a noise floor of 15.6 nε/√Hz. The mean noise throughout the fiber is 19.8 nε/√Hz while the noise in the last 10 m of the fiber is 24 nε/√Hz. Lastly, note that the increased noise beyond ~400 m is due to a fiber patchcord connection where a fraction of the pump power is lost.

Figure 8:
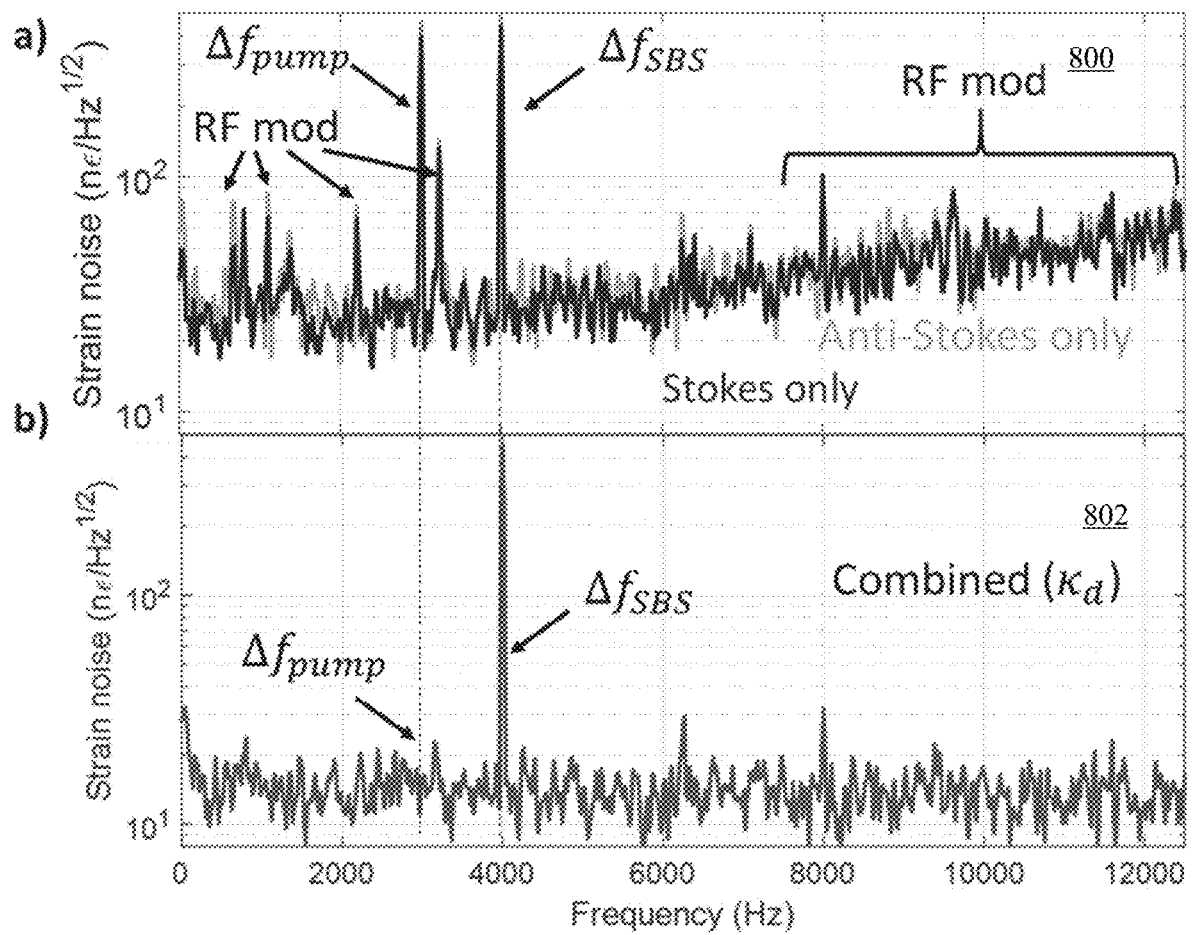
FIG. 8 depicts plots of strain noise versus frequency at one position in a fiber.
Figure 9:
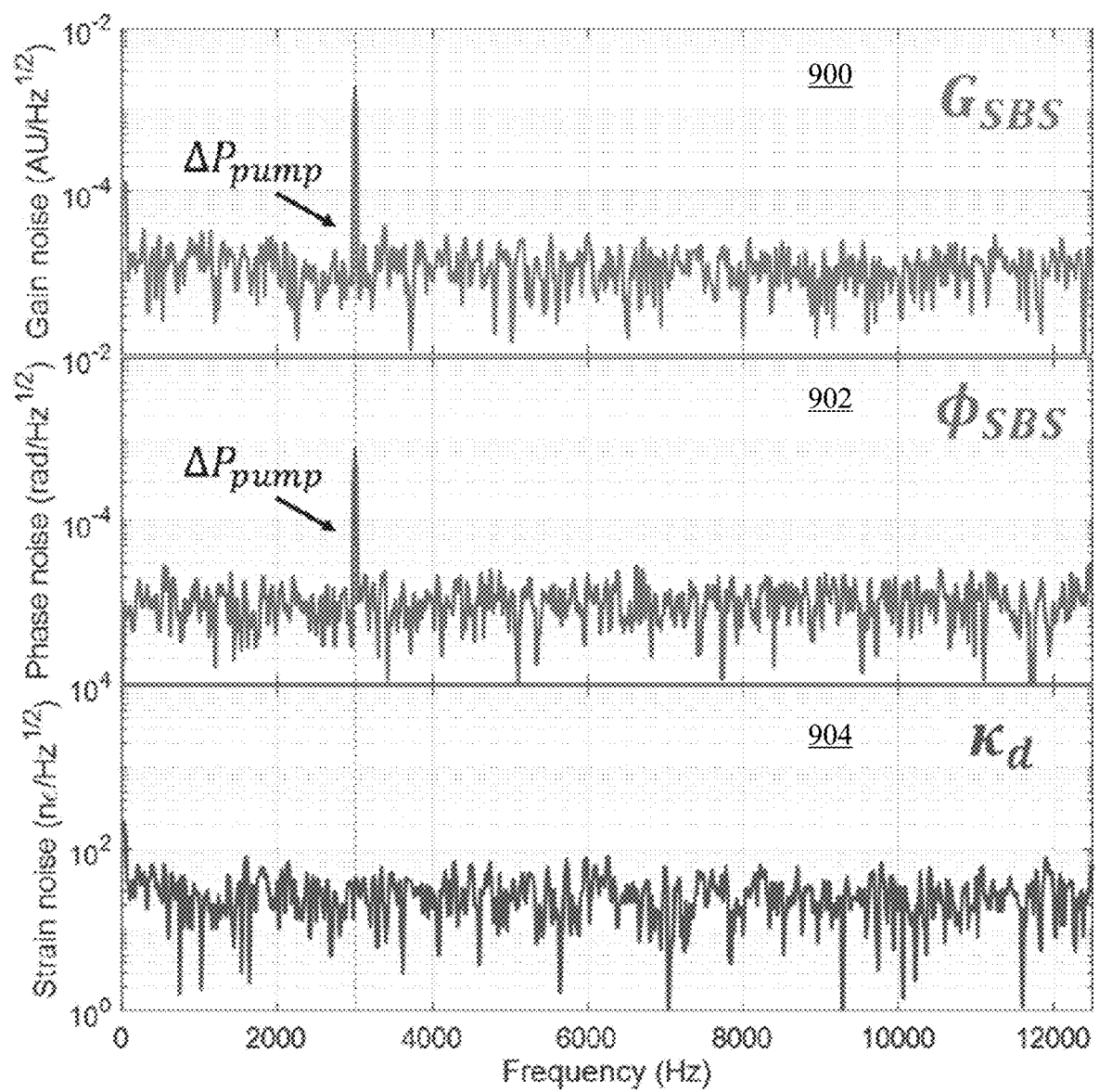
FIG. 9 depicts plots showing amplitude noise immunity of the phase per gain measurand in contrast to gain or phase only measurands, according to an example embodiment.
Figure 10:
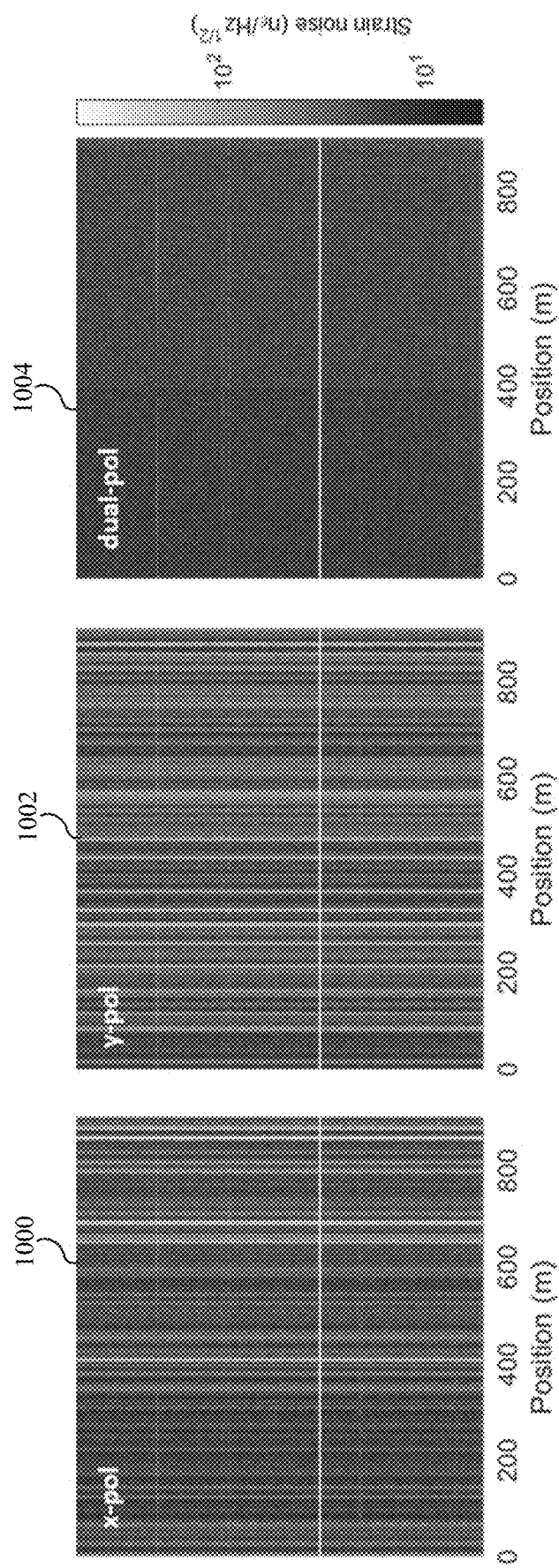
FIG. 10 depicts spectrograms of strain noise versus position and frequency.

The sensor system described herein provides considerably lower strain noise than traditional Brillouin sensors operating at this length scale. Such low noise is enabled by the systematic removal of the sensitivity to fluctuations in the power, frequency, and polarization state of the pump and probe. FIGS. 8-10 provide some comparison data between traditional systems and the sensor system described herein.

To test the ability of the described system (e.g., system 100 in FIG. 1) to reject laser frequency noise, $AOM_1$ was used to introduce a known frequency modulation to the pump pulse. At the same time, a frequency modulation was added to the drive signal applied to $EOM_3$ to simulate a dynamic change in the Brillouin frequency throughout the fiber. To understand the difference between these modulations, consider their effect on the relative spacing between the pump and the Stokes and anti-Stokes probes. Increasing the pump frequency using $AOM_1$ increases the frequency separation between the pump and the Stokes probe, but decreases the separation between the pump and anti-Stokes probes. This is precisely the type of differential signal the sensor system described herein is designed to suppress. In contrast, increasing $f_{\mu Wave}$ using $EOM_3$ increases the separation between the pump and both the Stokes and anti-Stokes probes, introducing the same effect as a decrease in the actual Brillouin frequency in the fiber.

FIG. 8 depicts plots of strain noise versus frequency at one position in a fiber. FIG. 8 shows the strain amplitude spectral density (ASD) at one position in the fiber recorded while the pump frequency was modulated at 3 kHz with a deviation of 200 kHz peak-peak (141 kHz RMS, equivalent to ~280 nε RMS) and the drive to $EOM_3$ was modulated at 4 kHz with a 200 kHz peak-peak frequency modulation. In order to illustrate the advantage of using the $k_d$ measurand, the strain ASD obtained using $k_d$ may be compared with the ASD obtained using k (equation 2) calculated using either the Stokes or anti-Stokes probes on their own. Top panel 800 of FIG. 8 shows the strain ASD obtained using only the Stokes or anti-Stokes interactions. In this case, the desired 4 kHz signal introduced to simulate a dynamic Brillouin frequency shift is clearly visible. However, the 3 kHz frequency modulation applied to the pump is also visible, highlighting the susceptibility of this approach to laser frequency noise or strain induced Doppler shifts. In addition, several narrow lines along with a broadband background (labelled "RF mod" in top panel 800) are observed due to the phase noise in the RF signal generator. A Tektronix AFG3252C was used to provide the RF drives such as the one to $EOM_2$ and these lines were also observed directly by measuring the electrical signal out of the function generator. Lower panel 802 in FIG. 8 shows the strain noise obtained using the $k_d$ measurand. In this case, the 4 kHz signal of interest is retained while the signal at 3 kHz due to laser frequency modulation is suppressed by at least 25 dB and is below the noise floor of the sensor. In addition, the narrow lines and broadband background noise introduced by the RF signal generator are suppressed as expected.

The sensitivity of the sensor system due to fluctuations in the laser power or cross-talk due to pump depletion was also evaluated. In this case, $AOM_1$ was used to modulate the amplitude of the pump laser at a frequency of 3 kHz with a modulation depth of 20%. FIG. 9 depicts plots showing amplitude noise immunity of the phase per gain measurand. In FIG. 9, a comparison was made of the strain noise ASD obtained with the $k_d$ measurand and a noise ASD obtained simply using the SBS phase or gain (i.e., using either the numerator or denominator of equation 10). Note that the system was biased near $\Delta f \cong 0$, which reduces the sensitivity of a SA-BOTDA gain measurement to SBS frequency shifts but not to changes in pump power. In FIG. 9, top panel 900 shows the results of using only the gain while middle panel 902 shows the effects of using the phase information, both of which are sensitive to pump power ($\Delta P_{pump}$ signal at 3 kHz). This highlights the sensitivity of gain measuring SA-BOTDA systems to laser intensity noise or cross-talk due to pump depletion. In contrast, as shown in bottom panel 904 of FIG. 9, the pump power fluctuation is suppressed by 40 dB using the $k_d$ measurand. This comparison illustrates the importance of using a coherent measurement system capable of recording both the amplitude and phase of the Brillouin interaction.

The ability of the sensor system to suppress polarization fading was also evaluated. In this case, a dynamic Brillouin shift was simulated throughout the fiber by modulating $EOM_3$ at 4 kHz. The strain noise was then calculated using only the x-polarized pump pulses or only the y-polarized pump pulses, as shown in FIG. 10 (plots 1000 and 1002). FIG. 10 depicts spectrograms of strain noise versus position. Although the signal level at 4 kHz remained unchanged throughout the fiber, the noise varied dramatically and increased by more than 20 dB at positions in the fiber where polarization fading was most pronounced as shown in FIG. 10, plots 1000 (x-polarized pump) and 1002 (y-polarized pump). In contrast, by combining the two polarization measurements using equation 7, a spectrogram was obtained with a consistent noise floor throughout the FUT, as shown in FIG. 10, plot 1004.

Figure 11:
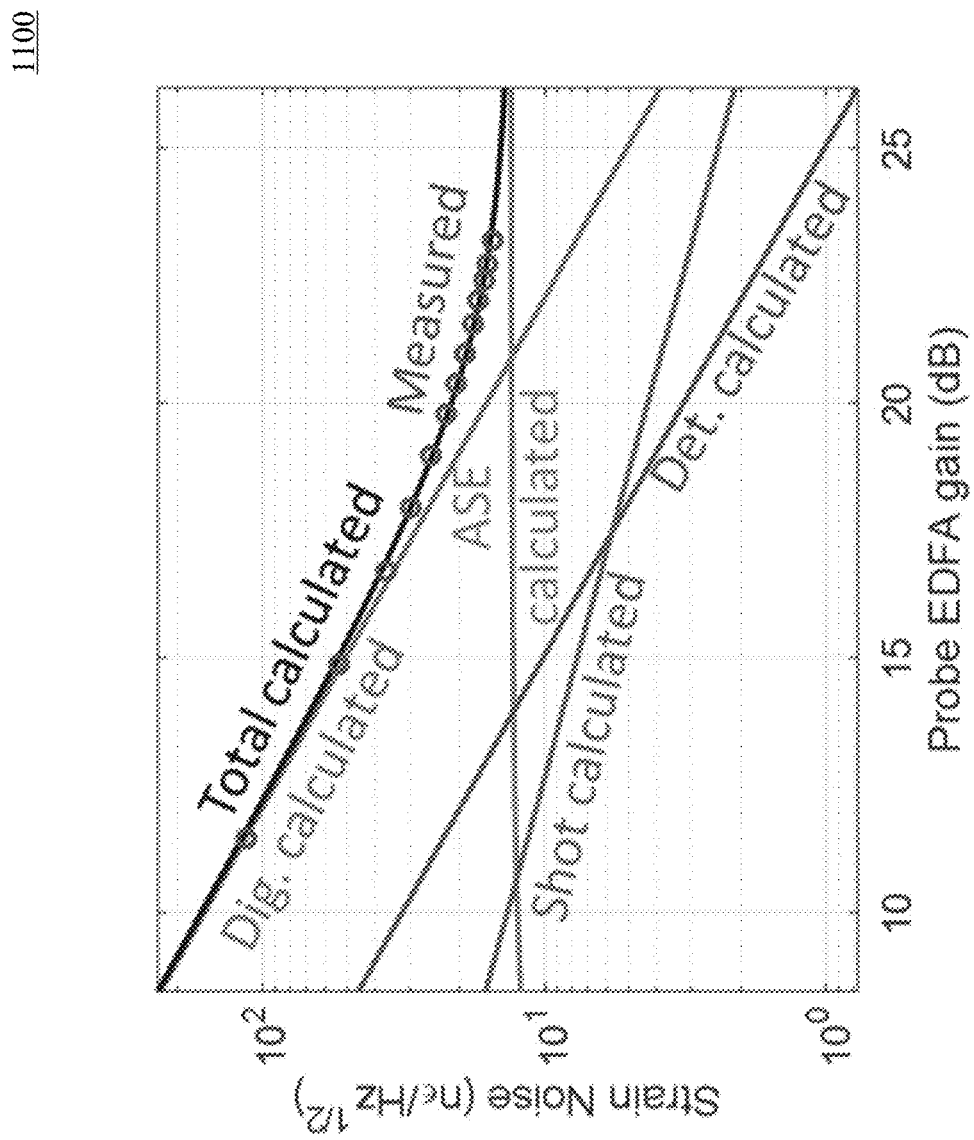
FIG. 11 is a plot of measured strain noise versus probe amplifier gain compared to various calculated noise sources.

The remaining sources of noise in the measurement were also considered. The uncertainty in the measured in $\kappa_d$, after including the effect of using a polarization diversity scheme, can be expressed as:

$$\sigma_{\kappa_d} \cong \frac{\sigma_a}{a_0 G_{SBS}} \sqrt{\kappa_d^2 + 1}$$

where $a_0$ is the measured signal amplitude in the absence of a Brillouin interaction and $\sigma_a$ is the RMS amplitude noise after detection and IQ demodulation. This amplitude noise may be introduced by a number of sources, including the detector, shot noise, or amplified spontaneous emission (ASE) from the EDFA. FIG. 11 is a plot of measured strain noise versus probe amplifier gain compared to various calculated noise sources. FIG. 11 shows how the measured strain noise varies with the gain of the probe EDFA (i.e., with increasing probe power) in comparison to the calculated noise introduced by the detector, digitizer, shot noise, and ASE. For low probe powers, the system may be limited by the analog to digital converter (ADC) noise at the digitizer. However, at higher powers, noise due to interference between in-band ASE and the probe begins to dominate. The experimentally measured noise is in excellent agreement with the predicted strain noise, confirming that this approach effectively suppressed many of the noise sources that may limit the performance of dynamic Brillouin sensors, such as laser frequency or intensity noise. This suggests that ~nε/√Hz level strain noise may be possible by minimizing the optical loss before and after the EDFA (which would reduce the ASE noise) and using a lower noise digitizer.

Figure 12:
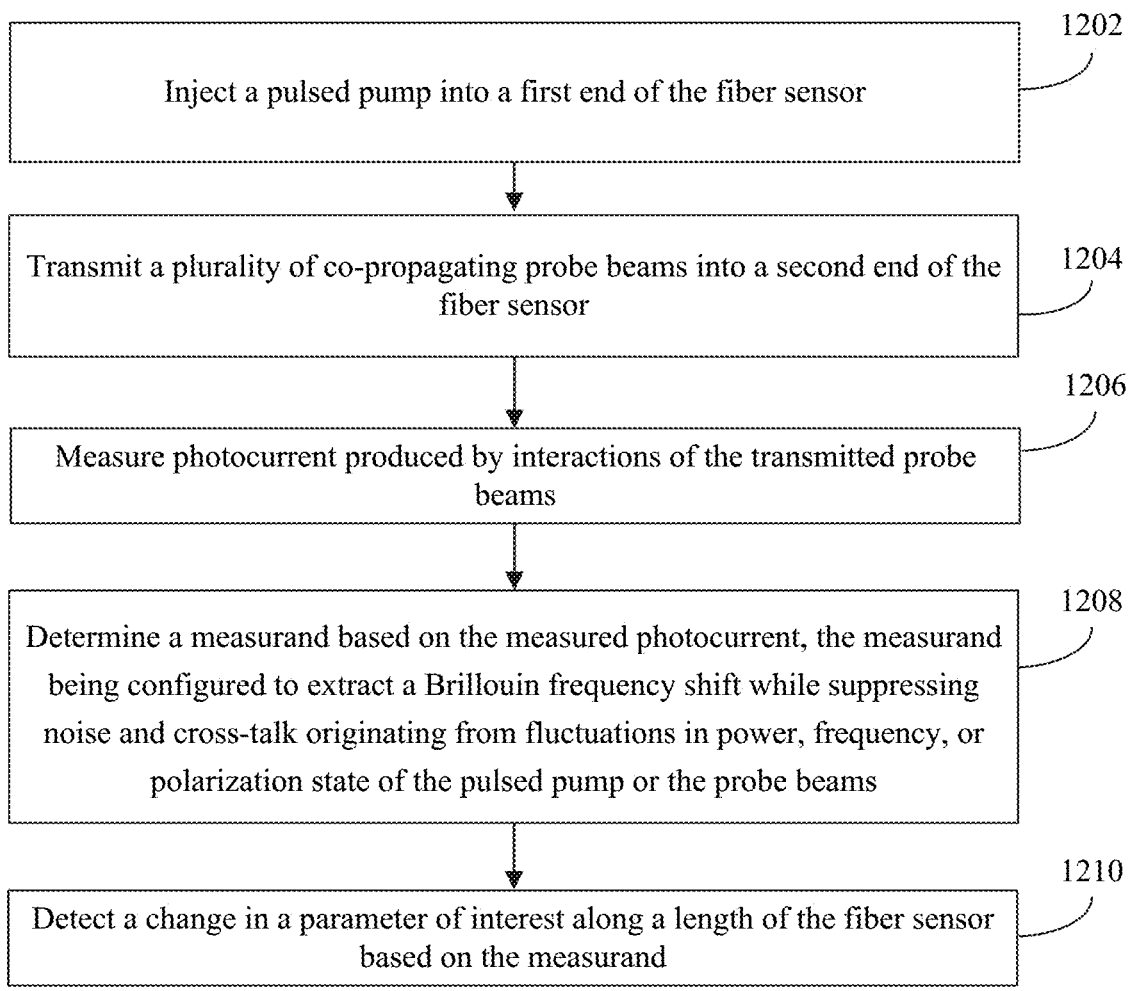
FIG. 12 is a flowchart for a method for suppressing noise and cross-talk in a Brillouin fiber sensor, according to an example embodiment.

Noise and cross-talk may be suppressed in a Brillouin fiber sensor in various ways. For instance, FIG. 12 is a flowchart 1200 for a method for suppressing noise and cross-talk in a Brillouin fiber sensor, according to an example embodiment. Flowchart 1200 may be performed by system 100 shown in FIG. 1 as described above, for example. However, the method of flowchart 1200 is not limited to that embodiment.

Flowchart 1200 begins with step 1202, a pump is injected into a first end of a fiber sensor. For example, the pulsed pump may be generated by dividing a narrow-linewidth laser into a pump path and a probe path, and modulating light directed along the pump path to generate the pump. The light may be modulated by one or more modulators in various ways. For example, the light may be modulated to generate a pulsed pump. The light may also be modulated (e.g., frequency modulated) in a manner to enable distributed measurements at many positions along the fiber. That is, the pump is enabled to interact with the probe(s) in such a way that their interaction may be localized to a region of interest. As another example, the pump may be a continuous wave, thereby enabling the interaction to occur across the entire fiber.

In step 1204, a plurality of co-propagating probe beams are transmitted into a second end of the fiber sensor. For instance, the probe beams may be generated by modulating light along the probe path with a pair of modulators to generate four probe beams that comprise a Stokes probe, a Stokes local oscillator sideband, an anti-Stokes probe, and an anti-Stokes local oscillator sideband.

In step 1206, a photocurrent produced by interactions of the transmitted probe beams is measured. For example, a pair of photodetectors (e.g., photodiodes or phototransistors) may be used to measure photocurrent produced by interactions of the transmitted probe beams. The probe beams may be processed (e.g., separated via a wavelength division multiplexer) prior to being measured.

In step 1208, a measurand based on the measured photocurrent is determined. The measurand is configured to extract a Brillouin frequency shift while suppressing noise and cross-talk originating from fluctuations in power, frequency, or polarization state of the pulsed pump or the probe beams. For instance, the measurand may be a dual probe gain to phase ratio ($\kappa_d$) that is determined based on measurements of both Stokes and anti-Stokes interactions. Thus, the measurand provides a linear response to changes in Brillouin frequency while removing any dependence on fluctuations in pump power or in frequency of the pulsed pump or probe beams.

In step 1210, a change in a parameter of interest is detected along a length of the fiber sensor based on the measurand. For example, the Brillouin frequency has a well-known relationship to strain and temperature in a fiber. Thus, by effectively and accurately extracting the Brillouin frequency shift, the absolute measurement that indicates a change in a parameter of interest (e.g., strain or temperature) may be detected along a length of the fiber sensor based on the measurand $\kappa_d$. The parameter of interest may be any parameter that may be detected via a change in the Brillouin resonance frequency, such as strain, temperature, or pressure. The fiber used in the system may be a standard optical fiber or may be a specialized fiber, and thus the parameter of interest may vary depending on the type or application of the fiber.

The method and Brillouin fiber sensor described herein use a new measurand, $\kappa_d$, that combines information from complex Stokes and anti-Stokes interactions, to extract the Brillouin frequency shift. The extraction may be performed while suppressing noise and cross-talk due to fluctuations in the power, frequency, or polarization state of the pump and probe beams. This approach provides greater than 25 dB reduction in sensitivity to laser frequency noise compared with traditional SA-BOTDA sensors that measure only the Stokes (or anti-Stokes) interactions. The system also provides greater than 20 dB suppression in sensitivity in laser intensity noise compared with a gain-measuring SA-BOTDA system, as well as immunity to polarization fading. By suppressing many of the noise sources that can limit the performance of dynamic Brillouin sensors, this approach enables an ultra-low strain noise of less than 20 nε/$\sqrt{Hz}$ in ~1 km of fiber with 4 m spatial resolution and 25 kHz bandwidth. The sensor noise may be limited by in band ASE from the EDFA and that ~nε/$\sqrt{Hz}$ level strain noise may be achievable with further optimization.

Example Computer System Implementation

Each of system 100 or its subsystems and flowchart 1200 may be implemented in hardware, or hardware combined with software or firmware. For example, system 100 and/or its components, and flowchart 1200 may be implemented as computer program code/instructions configured to be executed in one or more processors and stored in a computer readable storage medium. Alternatively, system 100 and its components, and flowchart 1200 may be implemented as hardware logic/electrical circuitry.

The terms "computer program medium," "computer-readable medium," and "computer-readable storage medium" are used herein to refer to physical hardware media such as the hard disk associated with a storage device. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

In an embodiment, system 100 and/or its components may be implemented in a system-on-a-chip (SoC). The SoC may include an integrated circuit that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 13:
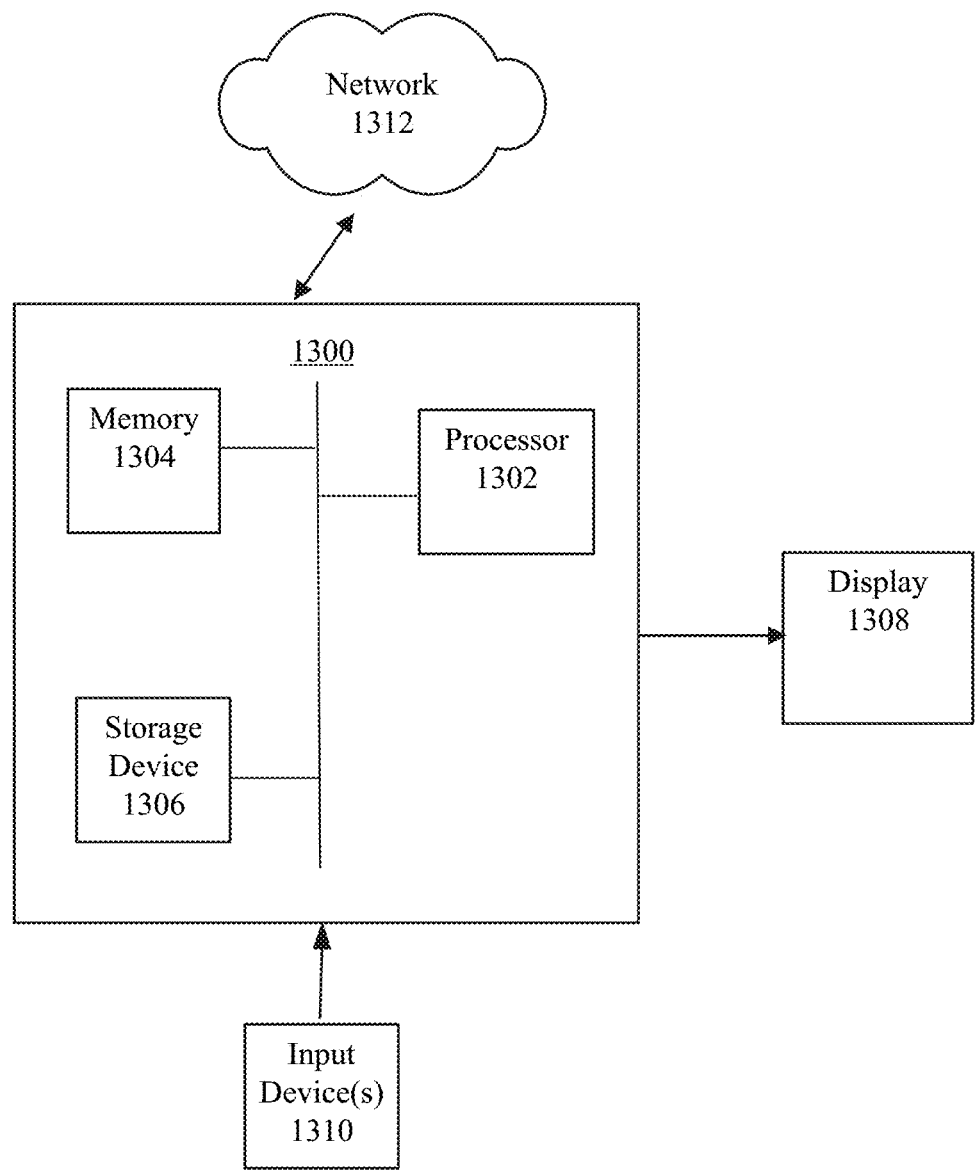
FIG. 13 is a block diagram of an example computer system in which embodiments may be implemented.

FIG. 13 is a block diagram of an example computer system in which embodiments may be implemented. The description of computing device 100 is provided for purposes of illustration, and is not intended to be limiting. Embodiments may be implemented in further types of computer systems, as would be known to persons skilled in the relevant art(s).

As shown in FIG. 13, computing device 1300 includes processor 1302, memory 1304, and storage device 1306, and these components may be coupled together via a bus.

Processor 1302 may be referred to as a processor circuit or a processing unit. Processor 102 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor 1302 may execute program code stored in a computer readable medium, such as program code of an operating system, an application program, and other programs.

Memory 1304 includes any system memory, for example, read only memory (ROM) and random access memory (RAM) and may store a basic input/output system (e.g., BIOS).

Storage device 1306 may include any a hard disk drive, a magnetic disk drive, an optical disk drive, a removable optical disk (e.g., CD ROM, DVID ROM), a flash memory card, a digital video disk, RAMs, ROMs, or other hardware storage media. Storage device 1306 and its associated computer readable media provide nonvolatile storage of computer-readable instructions, data structures, program modules and other data for computing device 1300.

A number of program modules may be stored on memory 1304 and/or storage device 106. These programs include an operating system, an application program, other programs, and program data. Such an application program or other programs may include, for example, computer program logic (e.g., computer program code or instructions) for implementing system components and/or embodiments described herein.

A user may enter commands and information into the computing device 1300 through input devices 1310 such as a keyboard and a pointing device. Other input devices (not shown) may include a microphone, joystick, game pad, satellite dish, scanner, touch screen and/or touch pad, voice recognition system to receive voice input, gesture recognition system to receive gesture input, or the like. These and other input devices are often connected to processor 102 through a serial port interface that is coupled to the bus, but may also be connected by other interfaces, such as a parallel port, game port, or a universal serial bus (USB).

A display 108 is also connected to the bus via an interface, such as a video adapter. Display 1308 may be external to or incorporated in computing device 1300. Display 1308 may display information, as well as being a user interface for receiving user commands and/or other information (e.g., by touch, finger gestures, virtual keyboard, etc.). In addition to display 1308, computing device 1300 may include other peripheral output devices (not shown) such as speakers and printers.

Computing device 1300 is connected to a network 1312 (e.g., the Internet) through an adaptor or network interface, a modem, or other means for establishing communications over the network.

CONCLUSION

While various embodiments of the disclosed subject matter have been described above, it should be understood that they have been presented by way of example only, and not limitation. Various modifications and variations are possible without departing from the spirit and scope of the embodiments as defined in the appended claims. Accordingly, the breadth and scope of the disclosed subject matter should not be limited by any of the above-described exemplary embodiments, but should be defined only in accordance with the following claims and their equivalents.

What is claimed is:

1. A method for suppressing noise and cross-talk in a Brillouin fiber sensor, the method comprising:
    injecting a pump into a first end of the fiber sensor;
    transmitting a plurality of co-propagating probe beams into a second end of the fiber sensor;
    measuring photocurrent produced by interactions of the transmitted probe beams;
    determining a measurand based on the measured photocurrent, the measurand being configured to extract a Brillouin frequency shift while suppressing noise and cross-talk originating from fluctuations in power or frequency of the pump or the probe beams; and
    detecting a change in a parameter of interest along a length of the fiber sensor based on the measurand.

2. The method of claim 1, further comprising:
    dividing a narrow-linewidth laser into a pump path and a probe path; and
    modulating light directed along the pump path to generate the pump.

3. The method of claim 2, wherein modulating light directed along the pump path to generate the pump comprises at least one of:
    modulating the light to generate a pulsed pump; or
    modulating the light in a manner to enable distributed measurements at a plurality of positions along the fiber.

4. The method of claim 2, wherein the probe beams are generated by modulating light along the probe path with a pair of modulators to generate four probe beams that comprise a Stokes probe, a Stokes local oscillator sideband, an anti-Stokes probe, and an anti-Stokes local oscillator sideband.

5. The method of claim 4, wherein the measurand comprises a dual probe gain to phase ratio and is determined based on measurements of both Stokes and anti-Stokes interactions.

6. The method of claim 4, wherein the measurand provides a linear response to changes in Brillouin frequency while removing any dependence on fluctuations in pump power or in frequency of the pulsed pump or probe beams.

7. The method of claim 1, wherein the photocurrent produced by the interactions of the probe beams is measured via a pair of photodetectors.

8. The method of claim 1, wherein the parameter of interest comprises at least one of a strain or temperature measurement.

9. A fiber optic sensor system comprising:
    an optical source configured to output a first optical signal into a first end of an optical fiber and a second optical signal into a second end of the optical fiber, the second optical signal being modulated into a plurality of co-propagating probe beams prior to being transmitted into the optical fiber;
    a pair of photodetectors configured to measure photocurrent produced by interactions of the transmitted probe beams; and
    a processing unit configured to
        determine a measurand based on the measured photocurrent, the measurand being configured to extract a Brillouin frequency shift while suppressing noise and cross-talk originating from fluctuations in power, frequency or polarization state of the pulsed pump or the probe beams, and
        detect a change in a parameter of interest along a length of the optical fiber based on the measurand.

10. The system of claim 9, wherein the first optical signal is modulated prior to being injected into the first end of the optical fiber.

11. The system of claim 9, further comprising:
    a pair modulators configured to generate the plurality of co-propagating probe beams that comprise a Stokes probe, a Stokes local oscillator sideband, an anti-Stokes probe, and an anti-Stokes local oscillator sideband.

12. The system of claim 9, wherein the pair of photodetectors comprise photodiodes.

13. The system of claim 9, wherein the measurand comprises a dual probe gain to phase ratio and is determined based on measurements of both Stokes and anti-Stokes interactions.

14. The system of claim 9, wherein the measurand provides a linear response to changes in Brillouin frequency while removing any dependence on fluctuations in pump power or in frequency of the pulsed pump or probe beams.

* * * * *